US 008469128B2

(12) United States Patent
Van Buren et al.

(10) Patent No.: US 8,469,128 B2
(45) Date of Patent: Jun. 25, 2013

(54) VARIABLE-BIAS SHUTTER

(75) Inventors: Brian D. Van Buren, Shelby Township, MI (US); Scott P. Charnesky, Birmingham, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 213 days.

(21) Appl. No.: 13/158,929

(22) Filed: Jun. 13, 2011

(65) Prior Publication Data

US 2012/0312611 A1    Dec. 13, 2012

(51) Int. Cl.
*B60K 11/08*    (2006.01)
(52) U.S. Cl.
USPC ............................................ 180/68.1; 165/44
(58) Field of Classification Search
USPC   180/68.1, 68.2, 68.3, 68.4, 68.6; 296/193.09, 296/193.1; 165/41, 42, 43, 44, 96
See application file for complete search history.

(56) References Cited

U.S. PATENT DOCUMENTS

| | | | | |
|---|---|---|---|---|
| 6,695,047 | B2 * | 2/2004 | Brocksopp | 165/292 |
| 8,281,754 | B2 * | 10/2012 | Saida et al. | 123/41.04 |
| 8,292,014 | B2 * | 10/2012 | Sugiyama | 180/68.1 |
| 8,316,974 | B2 * | 11/2012 | Coel et al. | 180/68.1 |
| 2012/0067655 | A1 * | 3/2012 | Charnesky et al. | 180/68.1 |
| 2012/0097465 | A1 * | 4/2012 | Leffert et al. | 180/68.1 |
| 2012/0111652 | A1 * | 5/2012 | Charnesky et al. | 180/68.1 |

* cited by examiner

*Primary Examiner* — John Walters
(74) *Attorney, Agent, or Firm* — Quinn Law Group, PLLC

(57) ABSTRACT

A variable-bias shutter system for controlling an airstream through an entryway includes a plurality of louvers. Each louver has a pivot axis and a louver face that includes a first portion arranged to one side and a second portion arranged to the other side of the respective pivot axis. The shutter system also includes a mechanism configured to select a position for the shutter system by rotating in tandem each of the plurality of louvers about the respective pivot axis. An area of the first portion that is exposed to the airstream is smaller than an area of the second portion when the shutter system is substantially closed. Additionally, the area of the first portion that is exposed to the airstream is larger than the area of the second portion when the shutter system is not closed. A vehicle employing the variable-bias shutter system is also disclosed.

20 Claims, 3 Drawing Sheets

VARIABLE-BIAS SHUTTER

TECHNICAL FIELD

The disclosure relates to a variable-bias shutter of the type including pivoting louvers for controlling and directing an airstream.

BACKGROUND

A shutter is typically a solid and stable covering for an opening. A shutter frequently consists of a frame and louvers or slats mounted within the frame.

Louvers may be fixed, i.e., having a permanently set angle with respect to the frame. Louvers may also be operable, i.e., having an angle that is adjustable with respect to the frame for permitting a desired amount of light, air, and/or liquid to pass from one side of the shutter to the other. Depending on the application and the construction of the frame, shutters can be mounted to fit within, or to overlap the opening. In addition to various functional purposes, particularly in architecture, shutters may also be employed for largely ornamental reasons.

SUMMARY

A variable-bias shutter system for controlling and directing an airstream through an entryway includes a plurality of louvers. Each louver has a pivot axis and a louver face configured to be variably exposed to the airstream. Each face includes a first portion arranged to one side and a second portion arranged to the other side of the respective pivot axis. The shutter system also includes a mechanism configured to select a position for the shutter system between and inclusive of fully opened and fully closed by rotating in tandem, i.e., largely in unison, each of the plurality of louvers about the respective pivot axis. An area of the first portion that is exposed to the airstream is smaller than an area of the second portion when the shutter system is substantially closed. Additionally, the area of the first portion that is exposed to the airstream is larger than the area of the second portion when the shutter system is not closed.

The airstream may be used to bias or urge the shutter system to maintain the fully closed position when the smaller area of the first portion is exposed to the airstream. The airstream may also be used to bias the shutter system toward the fully opened position when the larger area of the first portion is exposed to the airstream.

The second portion of each louver may be configured to screen or shield from the airstream at least a segment of the first portion of an adjacent louver when the shutter system is fully closed.

Furthermore, the shutter system may include a feature configured to screen from the airstream at least a segment of the first portion of an end louver that is not screened by an adjacent louver when the shutter system is fully closed.

The shutter system may further include a controller configured to regulate the mechanism.

The entryway may be a grille opening in a vehicle having an internal combustion engine. In such a case, the controller may be configured to regulate the mechanism according to a load on the engine.

The engine may be cooled by a fluid circulated through a heat exchanger, and the vehicle may include a sensor to sense a temperature of the fluid and configured to communicate the temperature to the controller. The controller may be configured to regulate the mechanism to cool the fluid circulated through the radiator according to the sensed temperature of the fluid.

The above features and advantages and other features and advantages of the present invention are readily apparent from the following detailed description of the best modes for carrying out the invention when taken in connection with the accompanying drawings.

DETAILED DESCRIPTION

Figure 1:
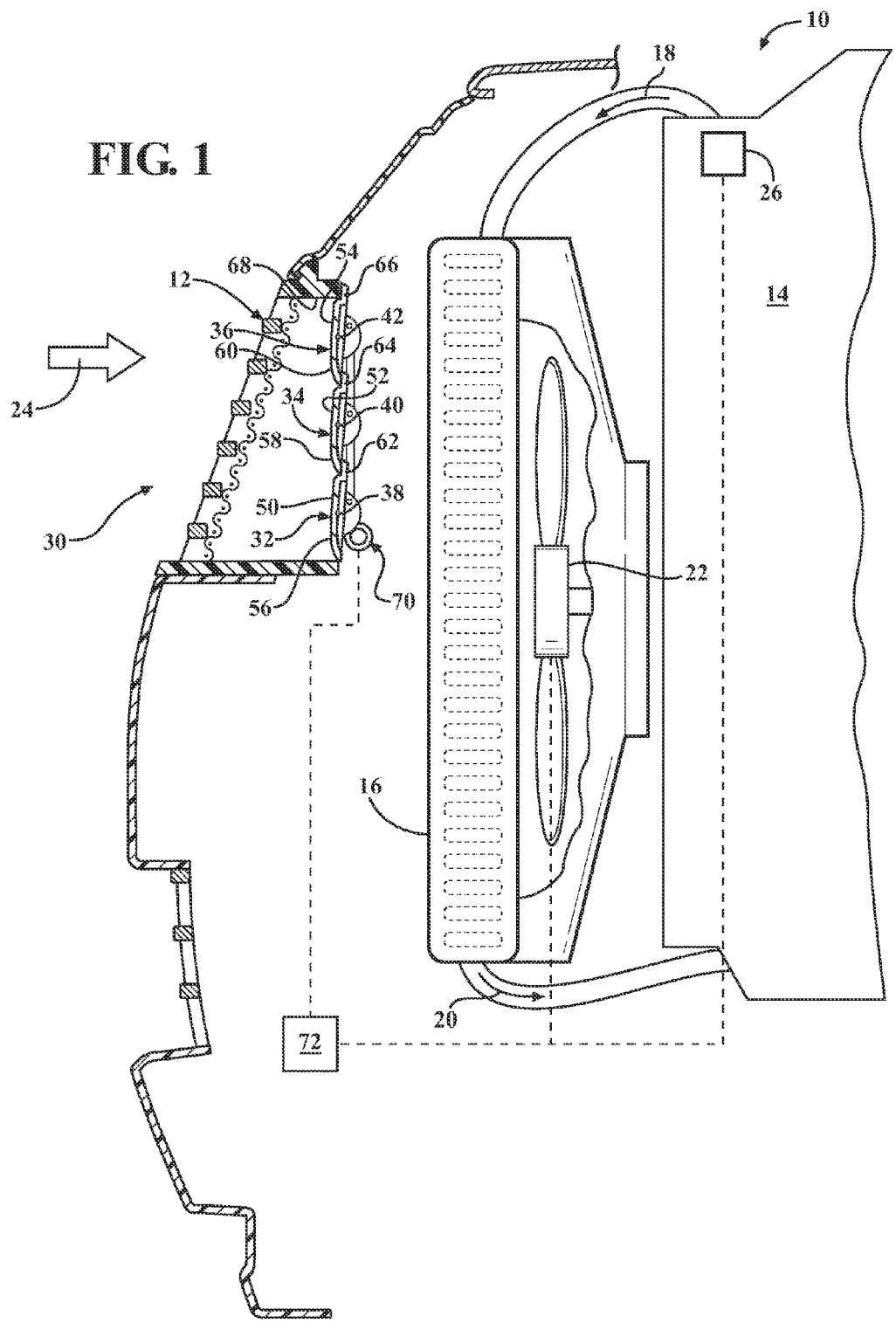
FIG. 1 is a partial side view of a vehicle having a variable-bias shutter system depicted in a fully closed state.
Figure 2:
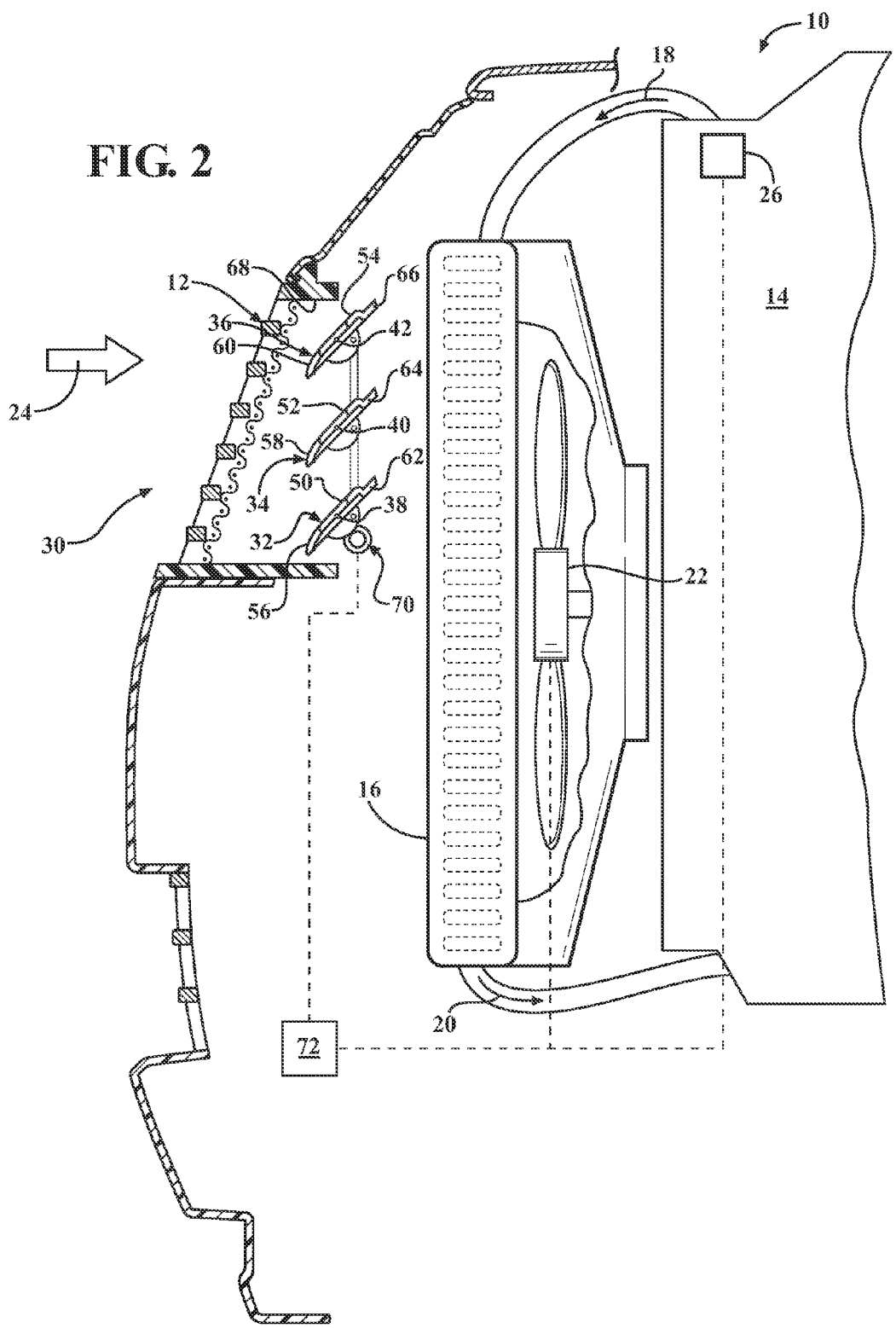
FIG. 2 is a partial side view of a vehicle having the shutter system shown in FIG. 1, with the shutter system depicted in an intermediate state.
Figure 3:
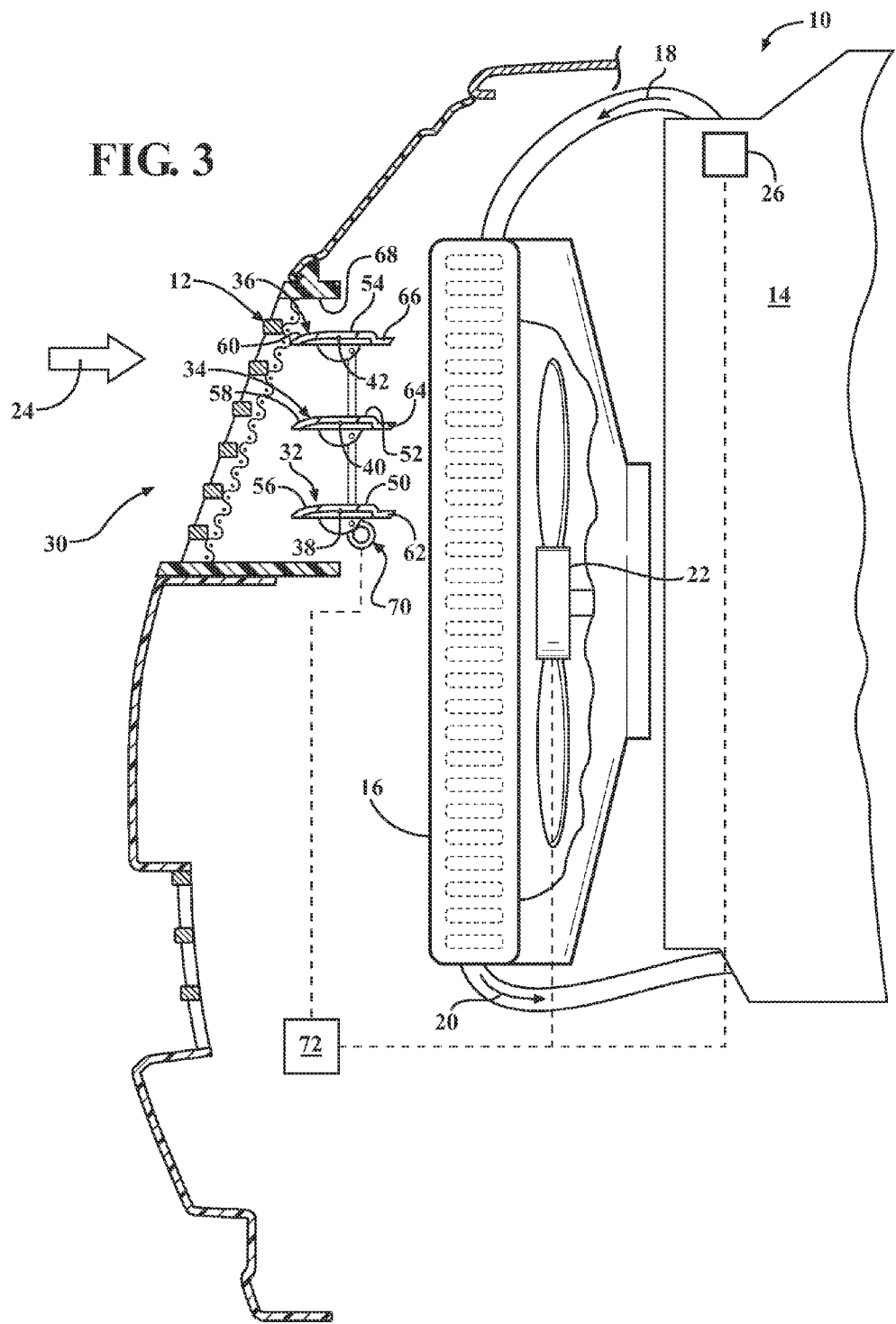
FIG. 3 is a partial side view of a vehicle having the shutter system shown in FIGS. 1 and 2, with the shutter system depicted in a fully opened state.

Referring to the drawings, wherein like reference numbers refer to like components, FIGS. 1-3 show a partial side view of a vehicle 10. The vehicle 10 is shown to include a grille opening 12 typically covered with a mesh. The grille opening 12 is adapted for receiving ambient air. The vehicle 10 additionally includes a powertrain that is specifically represented by an internal combustion engine 14. The powertrain of the vehicle 10 may additionally include a transmission, and, if the vehicle is a hybrid type, one or more motor-generators, none of which is shown, but the existence of which can be appreciated by those skilled in the art. Efficiency of a vehicle powertrain is generally influenced by its design, as well as by the various loads seen by the powertrain during its operation. Such loads typically drive up temperatures of the powertrain and necessitate appropriate cooling to sustain reliable performance thereof.

The vehicle 10 additionally includes an air-to-fluid heat exchanger 16, i.e., a radiator, for circulating a cooling fluid shown by arrows 18 and 20, such as water or a specially formulated coolant, through the engine 14 to remove heat from the engine. A high-temperature coolant entering the heat exchanger 16 is represented by the arrow 18, and a reduced-temperature coolant being returned to the engine is represented by an arrow 20. The heat exchanger 16 is positioned behind the grille opening 12 for protection of the heat exchanger from various road- and air-borne debris. The heat exchanger 16 may also be positioned in any other location, such as behind a passenger compartment, if, for example, the vehicle has a rear or a mid-engine configuration, as understood by those skilled in the art.

As shown in FIGS. 1-3, a fan 22 is positioned in the vehicle 10, behind the heat exchanger 16, such that the heat exchanger 16 is positioned between the grill opening 12 and the fan. The fan 22 is capable of being selectively turned on and off based on the cooling needs of the engine 14. Depending on the road speed of the vehicle 10, fan 22 either generates or enhances a flow of air or airstream 24 through the grille opening 12, and toward and through the heat exchanger 16. Thus generated or enhanced through the action of the fan 22, the airstream 24 is passed through the heat exchanger 16 to remove heat from the high-temperature coolant 18 before the reduced-temperature coolant 20 is returned to the engine 14. The fan 22 may be driven either electrically, or mechanically, directly by the engine 14. The vehicle 10 additionally includes a coolant sensor 26 configured to sense a temperature of the high-temperature coolant 18 as it exits the engine 14.

FIGS. 1-3 also depict a variable-bias shutter system 30. The shutter system 30 is secured in vehicle 10 and is adapted to control airstream 24 through the grille opening 12. The shutter system 30 is positioned behind, and immediately adjacent to the grille opening 12 at the front of the vehicle 10. As shown, shutter 30 is positioned between the grille opening 12 and the heat exchanger 16. The shutter system 30 may also be incorporated into and be integral with the grille opening 12. The shutter system 30 includes a plurality of rotatable or adjustable louvers, herein shown as having three individual louvers, a middle louver 34 and two end louvers 32, 36, but the number of louvers may either be fewer or greater.

Each louver 32, 34, and 36 is configured to rotate about a respective pivot axis 38, 40, and 42 during operation of the shutter system 30, thereby effectively controlling the size of the grille opening 12. The shutter system 30 is adapted to operate between and inclusive of a fully closed position or state (as shown in FIG. 1), through an intermediate or partially opened position (as shown in FIG. 2), and to a fully opened position (as shown in FIG. 3). When the louvers 32, 34, and 36 are in any of their non-closed positions, airstream 24 penetrates the plane of the shutter system 30 before coming into contact with the heat exchanger 16.

Each louver 32, 34, and 36 includes a respective louver face that is configured to be variably exposed to the airstream 24 during the rotation of the louvers. The face of each louver 32, 34, and 36 includes a respective first portion 50, 52, and 54 arranged to one side and a respective second portion 56, 58, and 60 arranged to the other side of its respective pivot axis 38, 40, and 42. The second portions 56 and 58 are configured to screen or shield from the airstream 24 segments 62 and 64 of the respective adjacent first portions 50 and 52 when the shutter system 30 is substantially closed. The shutter system 30 also includes a feature 68 configured to screen a segment 66 of the first portion 54 of the end louver 36 from the airstream 24 when the shutter system 30 is substantially closed. Therefore, the area of each first portion 50, 52, and 54 that is exposed to the airstream 24 is altered in response to the actual position of each louver 32, 34, and 36. On the other hand, the area of each second portion 56, 58, and 60 that is exposed to the airstream remains relatively constant regardless of position of the respective louver 32, 34, and 36.

As a result of the second portions 56, 58, and the feature 68 screening the first portions 50, 52, and 54 when the shutter system 30 is substantially closed, the area of each first portion 50, 52, and 54 that is exposed to the airstream 24 is smaller than the area of each respective second portion 56, 58, and 60. Additionally, because the second portions 56, 58, and the feature 68 do not screen the first portions 50, 52, and 54 when the shutter system 30 is not closed, the area of each first portion 50, 52, and 54 that is exposed to the airstream 24 is larger than the respective second portion 56, 58, and 60.

In a moving vehicle 10, the airstream 24 travels at a certain velocity with respect to the vehicle and generates positive air pressure at the grille opening 12. As a result, the force of the airstream 24 is used to bias or urge the shutter system 30 to urge and maintain its fully closed position when smaller areas of the first portions 50, 52, and 54 than of the second portions 56, 58, and 60 are exposed to the airstream. Additionally, the force of the airstream 24 is used to bias or urge the shutter system 30 toward the fully opened position when larger areas of the first portions 50, 52, and 54 than of the second portions 56, 58, and 60 are exposed to the airstream. Accordingly, as applied to the louvers 32-36, the term "variably exposed" denotes the fact that the overall area of each louver face that is exposed to the airstream 24 is varied or altered as a result of the position of the shutter system 30.

Depending on the immediate position of the louvers 32, 34, and 36, the shutter system 30 is configured to be variably and selectively biased to either the fully opened or the fully closed position. When in the non-closed state, regardless of the angle that the louvers 32, 34, and 36 assume with respect to the airstream 24, the ratio of the areas of the first portions 50, 52, and 54 to the respective second portions 56, 58, and 60 projected relative to the direction of the airstream remains substantially constant. Accordingly, the bias of the shutter system is specifically dependent on the areas of the first portions 50, 52, and 54 that become exposed to the airstream 24. Such purposeful biasing of the louvers 32, 34, and 36 serves to counteract variations in velocity of the airstream 24 and prevent tendency of the louvers to flutter. Additionally, the overall area of each first portion 50, 52, and 54, as well as the area of the corresponding segments 62, 64, and 66 may be selected in proportion to the area of each respective second portion 56, 58, and 60 in order to further minimize flutter of the louvers. Appropriate material as well as the thickness for the louvers 32, 34, and 36 may also be selected in order to enhance louver stiffness and further minimize flutter. The determination and selection of the appropriate areas and thicknesses for all the discrete portions, as well as the material for the louvers 32, 34, and 36 may be accomplished with the aid of calculations and finalized empirically during testing and development of the shutter system 30.

The shutter system 30 also includes a mechanism 70 configured to select and lock a desired position for the shutter system between and inclusive of the fully opened and fully closed. The mechanism 70 is configured to cause the louvers 32-36 to rotate in tandem, i.e., substantially in unison, about their respective pivot axes 38, 40, and 42 to any of the available positions. The mechanism 70 may be configured to infinitely vary the position of the louvers 32-36 between and inclusive of the fully opened and fully closed, and to select and lock any discrete position of the louvers. The mechanism 70 acts to select the desired position for the shutter system 30 when activated by any external means, as understood by those skilled in the art, such as an electric motor (not shown). The vehicle 10 also includes a controller 72, which may be an engine controller or a separate control unit, configured to regulate the mechanism 70 for selecting the desired position of the shutter system 30. The controller 72 may also be configured to operate the fan 22, if the fan is electrically driven, and a thermostat (not shown) that is configured to regulate the circulation of coolant, as understood by those skilled in the art.

The controller 72 is programmed to regulate the mechanism 70 according to the load on the engine 14 and, correspondingly, to the temperature of the coolant sensed by the sensor 26. The temperature of the high-temperature coolant 18 is increased due to the heat produced by the engine 14 under load. As known by those skilled in the art, an increased load on the engine 14 typically results from specific operating conditions imposed on the vehicle 10, such as going up a hill and/or pulling a trailer. Such increased load on the engine 14 generally drives up internal temperature of the engine, which in turn necessitates increased cooling of the engine for desired performance and reliability. Prior to exiting the engine 14, the coolant is routed inside the engine in order to most effectively remove heat from critical engine components, such as bearings (not shown, but known by those skilled in the art). Typically, the coolant is continuously circulated by a fluid pump (not shown) between engine 14 and heat exchanger 16.

The fully closed position of the louvers 32-36 (as shown in FIG. 1) is selected by the controller 72 according to a programmed algorithm when powertrain cooling does not necessitate the airstream 24 to pass through the grille opening 12. When the fully closed position of the shutter system 30 is selected by the controller 72, the first portions 50, 52, and 54 are covered by second portions 58, 60, and the feature 68, respectively, thereby biasing the shutter system to maintain the fully closed position. Accordingly, in the fully closed position, the variable-bias shutter system 30 ensures complete blockage of the airflow 24.

The partially opened position of the louvers 32-36 (as shown in FIG. 2) is selected by the controller 72 according to a programmed algorithm when an intermediate level of powertrain cooling is demanded. When the partially opened position of the shutter system 30 is selected by the controller 72, the first portions 50, 52, and 54 are uncovered, thereby biasing the shutter system toward the fully opened position. Accordingly, in the partially opened position, the variable-bias shutter system 30 ensures stable arrangement of the louvers 32-36 while partially restricting passage of the airflow 24 through the grille opening 12.

The fully opened position of the louvers 32-36 (as shown in FIG. 3) is selected by the controller 72 according to a programmed algorithm when maximum powertrain cooling is required and an unrestricted amount of the airstream 24 must be passed through the grille opening 12. When the fully opened position of the shutter system 30 is selected by the controller 72, the first portions 50, 52, and 54 are again uncovered, thereby biasing the shutter system to remain in the fully opened position. Accordingly, in the fully opened position, the variable-bias shutter system 30 ensures unrestricted passage of the airflow 24 through the grille opening 12.

Overall, the variable exposure of the louvers 32, 34, and 36 to the airstream 24 provides distinct biasing of the shutter system 30. Furthermore, the variable biasing of the shutter system 30 counteracts the tendency of the louvers 32, 34, and 36 to flutter and deviate from their intended position due to the variations in velocity of the airstream 24.

While the best modes for carrying out the invention have been described in detail, those familiar with the art to which this invention relates will recognize various alternative designs and embodiments for practicing the invention within the scope of the appended claims.

The invention claimed is:

1. A variable-bias shutter system for controlling an airstream through an entryway, the shutter system comprising:
   a plurality of louvers, each louver having a pivot axis and a louver face configured to be variably exposed to the airstream, wherein each face includes a first portion arranged to one side and a second portion arranged to the other side of the respective pivot axis; and
   a mechanism configured to select a position for the shutter system between and inclusive of fully opened and fully closed by rotating in tandem each of the plurality of louvers about the respective pivot axis;
   wherein an area of the first portion that is exposed to the airstream is smaller than an area of the second portion when the shutter system is substantially closed and the area of the first portion that is exposed to the airstream is larger than the area of the second portion when the shutter system is not closed.

2. The variable-bias shutter system of claim 1, wherein the airstream is used to bias the shutter system to maintain the fully closed position when the smaller area of the first portion is exposed to the airstream.

3. The variable-bias shutter system of claim 1, wherein the airstream is used to bias the shutter system toward the fully opened position when the larger area of the first portion is exposed to the airstream.

4. The variable-bias shutter system of claim 1, wherein the second portion of each louver is configured to screen from the airstream at least a segment of the first portion of an adjacent louver when the shutter system is fully closed.

5. The variable-bias shutter system of claim 4, further comprising a feature configured to screen from the airstream at least a segment of the first portion of an end louver that is not screened by an adjacent louver when the shutter system is fully closed.

6. The variable-bias shutter system of claim 1, further comprising a controller configured to regulate the mechanism.

7. The variable-bias shutter system of claim 6, wherein the entryway is a grille opening in a vehicle having an internal combustion engine, and the controller is configured to regulate the mechanism according to a load on the engine.

8. The variable-bias shutter system of claim 7, wherein the engine is cooled by a fluid circulated through a heat exchanger, and the vehicle includes a sensor configured to sense a temperature of the fluid and communicate the temperature to the controller.

9. The variable-bias shutter system of claim 8, wherein the controller is configured to regulate the mechanism to cool the fluid circulated through the heat exchanger according to the sensed temperature of the fluid.

10. A vehicle comprising:
    an internal combustion engine cooled by a circulating fluid;
    a heat exchanger configured to cool the fluid via an airstream after the fluid cools the engine;
    a grille defining a grille opening positioned to permit the airstream to pass through on the way to the heat exchanger; and
    a variable-bias shutter system for controlling the airstream through the grille opening, the shutter system having:
       a plurality of louvers, each louver having a pivot axis and a louver face configured to be variably exposed to the airstream, wherein each face includes a first portion arranged to one side and a second portion arranged to the other side of the respective pivot axis; and
       a mechanism configured to select a position for the shutter system between and inclusive of fully opened and fully closed by rotating in tandem each of the plurality of louvers about the respective pivot axis;
       wherein an area of the first portion that is exposed to the airstream is smaller than an area of the second portion when the shutter system is substantially closed and the area of the first portion that is exposed to the airstream is larger than the area of the second portion when the shutter system is not closed.

11. The vehicle of claim 10, wherein the airstream is used to bias the shutter system to maintain the fully closed position when the smaller area of the first portion is exposed to the airstream.

12. The vehicle of claim 10, wherein the airstream is used to bias the shutter system toward the fully opened position when the larger area of the first portion is exposed to the airstream.

13. The vehicle of claim 10, wherein the second portion of each louver is configured to screen from the airstream at least a segment of the first portion of an adjacent louver when the shutter system is fully closed.

14. The vehicle of claim 13, further comprising a feature configured to screen from the airstream at least a segment of the first portion of an end louver that is not screened by an adjacent louver when the shutter system is fully closed.

15. The vehicle of claim 10, further comprising a controller configured to regulate the mechanism.

16. The vehicle of claim 15, wherein the controller is configured to regulate the mechanism according to a load on the engine.

17. The vehicle of claim 16, wherein the vehicle includes a sensor configured to sense a temperature of the fluid and communicate the temperature to the controller.

18. The vehicle of claim 17, wherein the controller is configured to regulate the mechanism to cool the fluid circulated through the heat exchanger according to the sensed temperature of the fluid.

19. A variable-bias shutter system for controlling an airstream through an entryway, the shutter system comprising:
 a plurality of louvers, each louver having a pivot axis and a louver face configured to be variably exposed to the airstream, wherein each face includes a first portion arranged to one side and a second portion arranged to the other side of the respective pivot axis; and
 a mechanism configured to select a position for the shutter system between and inclusive of fully opened and fully closed by rotating in tandem each of the plurality of louvers about the respective pivot axis;
 wherein:
  an area of the first portion that is exposed to the airstream is smaller than an area of the second portion when the shutter system is substantially closed and the area of the first portion that is exposed to the airstream is larger than the area of the second portion when the shutter system is not closed;
  the airstream is used to bias the shutter system to maintain the fully closed position when the smaller area of the first portion is exposed to the airstream and is used to bias the shutter system toward the fully opened position when the larger area of the first portion is exposed to the airstream; and
  the second portion of each louver is configured to screen from the airstream at least a segment of the first portion of an adjacent louver when the shutter system is fully closed.

20. The variable-bias shutter system of claim 19, wherein the second portion of each louver is configured to screen from the airstream at least a segment of the first portion of an adjacent louver when the shutter system is fully closed, further comprising a feature configured to screen from the airstream at least a segment of the first portion of an end louver that is not screened by an adjacent louver.

* * * * *